United States Patent
Shih

(10) Patent No.: US 11,163,268 B2
(45) Date of Patent: Nov. 2, 2021

(54) WRISTWATCH AND POWER SAVING METHOD THEREOF

(71) Applicant: PRINCO CORP., Hsinchu (TW)

(72) Inventor: Ying-Che Shih, Hsinchu (TW)

(73) Assignee: PRINCO CORP., Hsinchu (TW)

( * ) Notice: Subject to any disclaimer, the term of this patent is extended or adjusted under 35 U.S.C. 154(b) by 395 days.

(21) Appl. No.: 16/398,328

(22) Filed: Apr. 30, 2019

(65) Prior Publication Data

US 2020/0125039 A1    Apr. 23, 2020

(30) Foreign Application Priority Data

Oct. 19, 2018  (TW) .................................. 107137079

(51) Int. Cl.

| | |
|---|---|
| *G04G 21/04* | (2013.01) |
| *G04G 17/08* | (2006.01) |
| *G04G 19/00* | (2006.01) |
| *G04G 21/08* | (2010.01) |
| *G06F 1/16* | (2006.01) |
| *G06F 1/3203* | (2019.01) |
| *G06K 19/07* | (2006.01) |

(52) U.S. Cl.
CPC .............. *G04G 21/04* (2013.01); *G04G 17/08* (2013.01); *G04G 19/00* (2013.01); *G04G 21/08* (2013.01); *G06F 1/163* (2013.01); *G06F 1/3203* (2013.01); *G06K 19/0723* (2013.01)

(58) Field of Classification Search
CPC ........ G04G 21/04; G04G 17/08; G04G 19/00; G04G 21/08

USPC .......................................................... 368/11
See application file for complete search history.

(56) References Cited

U.S. PATENT DOCUMENTS

| | | | |
|---|---|---|---|
| 6,646,960 B1 * | 11/2003 | Nagata ................... | G04G 19/00 368/204 |
| 9,906,929 B2 | 2/2018 | Tsuchiya | |
| 2016/0261733 A1 * | 9/2016 | Cho ........................ | G04G 21/04 |
| 2018/0217563 A1 | 8/2018 | Ihashi | |
| 2019/0020380 A1 * | 1/2019 | Chiu ..................... | H04B 5/0081 |

FOREIGN PATENT DOCUMENTS

WO      2017141012 A1    8/2017

* cited by examiner

*Primary Examiner* — Edwin A. Leon
(74) *Attorney, Agent, or Firm* — Mark M. Friedman

(57) ABSTRACT

A wristwatch and a power saving method thereof are provided herein. The wristwatch comprises: a time indicating device, configured to provide time information; a housing, defining a receiving room; a short distance communication module disposed in the receiving room, configured to implement short distance wireless communication with an external device, the communication module comprising: a security element, configured to process user security data; and a first coil, coupled to the security element and configured to transmit electromagnetic signals to communicate with the external device; the wristwatch further comprising: a second coil, coupled to the communication module, configured to sense an external magnetic field to generate a sensing signal, the sensing signal provided for controlling the communication module to be turned on or off to enable or disable transmission of the electromagnetic signals of the first coil. The wristwatch can reduce power consumption.

20 Claims, 9 Drawing Sheets

WRISTWATCH AND POWER SAVING METHOD THEREOF

BACKGROUND

1. Field of the Disclosure

The present application relates to a wristwatch, and more particularly to a wristwatch capable of implementing short distance communication and a power saving method thereof.

2. Description of Related Art

Short distance communication has been widely used in various application scenarios. Radio frequency identification (RFID) and near field communication (NFC) are common short distance communication technologies. Also, physical or virtual electronic cards, such as a transportation card, an entrance card, and an electronic payment card, conforming with RFID or NFC communication standard are widely used in a human's daily life.

Currently, a traditional wristwatch having physical indicators (e.g., an hour hand, a minute hand, and a second hand) lacks a communication function and thus is unable to communicate with an external device. Although short distance communication has been implemented in various of wearable devices such as smartwatches, the short distance communication function needs a user to turn on and off manually by a button on a screen. For the user, it needs tedious operations and is lack of convenience. Accordingly, there is a need to provide a new solution to solve this problem.

SUMMARY

The present application provides a wristwatch and a power saving method thereof, which can automatically control short distance communication to be enabled or disabled, thereby saving power consumption.

In an aspect, the present application provides a wristwatch, including: a time indicating device, configured to provide time information; a housing, defining a receiving room; a short distance communication module disposed in the receiving room, configured to implement short distance wireless communication with an external device, the short distance communication module including: a security element, configured to process user security data; and a first coil, coupled to the security element and configured to transmit electromagnetic signals to communicate with the external device; the wristwatch further including: a second coil, coupled to the short distance communication module, configured to sense an external magnetic field to generate a sensing signal, the sensing signal provided for controlling the short distance communication module to be turned on or off to enable or disable transmission of the electromagnetic signals of the first coil.

In another aspect, the present application provides a wristwatch, including: a time indicating device, configured to provide time information; a housing, defining a receiving room; a short distance communication module disposed in the receiving room, configured to implement short distance wireless communication with an external device, the short distance communication module including: a security element, configured to process user security data; and a coil, coupled to the security element and configured to transmit electromagnetic signals to communicate with the external device; the wristwatch further including: a first switch controller connected between the security element and the coil; a second switch controller connected to the coil of the short distance communication module; a signal processing circuit connected to the coil of the short distance communication module via the second switch controller, configured to process a sensing signal generated by sensing an external magnetic field by the coil to generate a switch signal having any of a first voltage level and a second voltage level; and a controller connected to or coupled to the first switch controller, the second switch controller, and the signal processing circuit, configured to receive the switch signal generated by the signal processing circuit, wherein when the switch signal has the first voltage level, the controller turns on the first switch controller and turns off the second switch controller to form a closed circuit between the coil and the security element and an open circuit between the coil and the signal processing circuit; when the switch signal has the second voltage level, the controller turns off the first switch controller and turns on the second switch controller to form an open circuit between the coil and the security element and a closed circuit between the coil and the signal processing circuit.

In still another aspect, the present application provides a power saving method for a wristwatch, the wristwatch including a time indicating device and a housing, the time indicating device configured to provide time information, the housing defining a receiving room, the method including: providing a short distance communication module in the receiving room; utilizing the short distance communication module to implement short distance wireless communication with an external device, wherein the short distance communication module includes a security element and a first coil, the security element configured to process user security data, the first coil configured to transmit electromagnetic signals to communicate with the external device; and utilizing a second coil to sense an external magnetic field to generate a sensing signal, and utilizing the sensing signal to control the short distance communication module to be turned on or off to enable or disable transmission of the electromagnetic signals of the first coil.

In yet another aspect, the present application provides a power saving method for a wristwatch, the wristwatch including a time indicating device and a housing, the time indicating device configured to provide time information, the housing defining a receiving room, the method including: providing a short distance communication module in the receiving room; utilizing the short distance communication module to implement short distance wireless communication with an external device, wherein the short distance communication module includes a security element and a coil, the security element configured to process user security data, the coil configured to transmit electromagnetic signals to communicate with the external device; utilizing a signal processing circuit to process a sensing signal generated by sensing an external magnetic field by the coil to generate a switch signal having any of a first voltage level and a second voltage level; and utilizing a controller to receive the switch signal generated by the signal processing circuit to form a closed circuit between the coil and the security element and an open circuit between the coil and the signal processing circuit when the switch signal has the first voltage level, and form an open circuit between the coil and the security element and a closed circuit between the coil and the signal processing circuit when the switch signal has the second voltage level.

In an embodiment of the present application, an opening exposes at a side of the housing, and the time indicating device includes: a transparent top cover, covering the exposed opening on the housing, the housing and the transparent top cover defining the receiving room; a dial, disposed in the receiving room; a plurality of physical scales, forming on a face of the dial facing the transparent top cover; at least one physical indicator, located between the dial and the transparent top cover; and a movement, configured to drive the at least one physical indicator to provide the time information by cooperation between the at least one physical indicator and the physical scales on the dial.

In an embodiment of the present application, the housing includes: an outer case having a closed ring structure made of metal material, the closed ring structure having a closed ring configuration constructed by a successive, solid, metal material, the closed ring structure having a first opening at a first side and a second opening at a second side opposite to the first side; and a bottom cover made of metal material, the bottom cover sealing the first opening of the closed ring structure and the transparent top cover sealing the second opening of the closed ring structure, the transparent top cover made of non-metal material.

In an embodiment of the present application, an opening exposes at a side of the housing, and the time indicating device includes: a touch display, covering the exposed opening on the housing but allowing transmission of the electromagnetic signals, the touch display having a function of providing the time information, the receiving room defined between the housing and the touch display.

In an embodiment of the present application, the wristwatch further includes: a signal processing circuit connected to the second coil, configured to process the sensing signal generated by sensing the external magnetic field by the second coil to generate a switch signal having any of a first voltage level and a second voltage level; and a controller connected between the signal processing circuit and the short distance communication module, configured to receive the switch signal generated by the signal processing circuit, turn on the short distance communication module to enable transmission of the electromagnetic signals of the first coil when the switch signal has the first voltage level, and turn off the short distance communication module to disable transmission of the electromagnetic signals of the first coil when the switch signal has the second voltage level.

In an embodiment of the present application, the switch signal is generated based on strength of the sensing signal of the second coil.

In an embodiment of the present application, the switch signal is generated based on a frequency of the sensing signal of the second coil.

In an embodiment of the present application, the signal processing circuit includes a threshold circuit having an input end receiving the sensing signal of the second coil and an output end outputting the switch signal, and the switch signal is a two-value output signal.

In an embodiment of the present application, the controller controls a period that the short distance communication module is switched on, and automatically switches off the short distance communication module at the end of the period.

In an embodiment of the present application, the short distance communication module further includes: an amplifier disposed between the first coil and the security element, configured to increase or adjust strength of the electromagnetic signals transmitted by the first coil to adjust a signal transmission distance.

In the present application, the wristwatch has the short distance communication module disposed therein. The short distance communication module includes the security element configured to process user security data and the first coil configured to transmit electromagnetic signals to communicate with an external device. In addition, the wristwatch has the second coil disposed therein. The second coil is configured to sense an external magnetic field to generate a sensing signal, and the sensing signal is utilized to control the short distance communication module to be turned on or off to enable or disable transmission of the electromagnetic signals of the first coil. When the wristwatch is placed close to the external device, the second coil senses the external magnetic field generated by the external device such that the short distance communication module is turned on to enable the first coil to transmit the electromagnetic signals. That is, the short distance communication module can be automatically turned on when short distance communication is needed. The short distance communication module can be automatically turned off when short distance communication is not needed. The present application can reduce a risk of eavesdropping and a risk of being stolen for security data during communication, and meanwhile, can also save power consumption by the wristwatch.

DETAILED DESCRIPTION OF PREFERRED EMBODIMENTS

To make the objectives, technical schemes, and technical effects of the present application more clearly and definitely, the present application will be described in details below by using embodiments in conjunction with the appending drawings. It should be understood that the specific embodiments described herein are merely for explaining the present application, and as used herein, the term "embodiment" refers to an instance, an example, or an illustration but is not intended to limit the present application. In addition, the articles "a" and "an" as used in the specification and the appended claims should generally be construed to mean "one or more" unless specified otherwise or clear from the context to be directed to a singular form.

The present application relates to a wristwatch and a power saving method thereof. The wristwatch may be implemented by a traditional wristwatch with physical indicators (e.g., as a hour hand, a minute hand, and a second hand), and a digital watch or a smartwatch that provides time information using a display. The wristwatch of the present application includes a short distance communication module that can communicate with other electronic devices using short distance communication technologies. The present application can automatically turn on the short distance communication module when the short distance communication is needed, and automatically turn off the short distance communication module when the short distance communication is not needed, thereby saving power consumption and also reducing a risk of eavesdropping during the communication and a risk of being stolen for security data.

Figure 1:
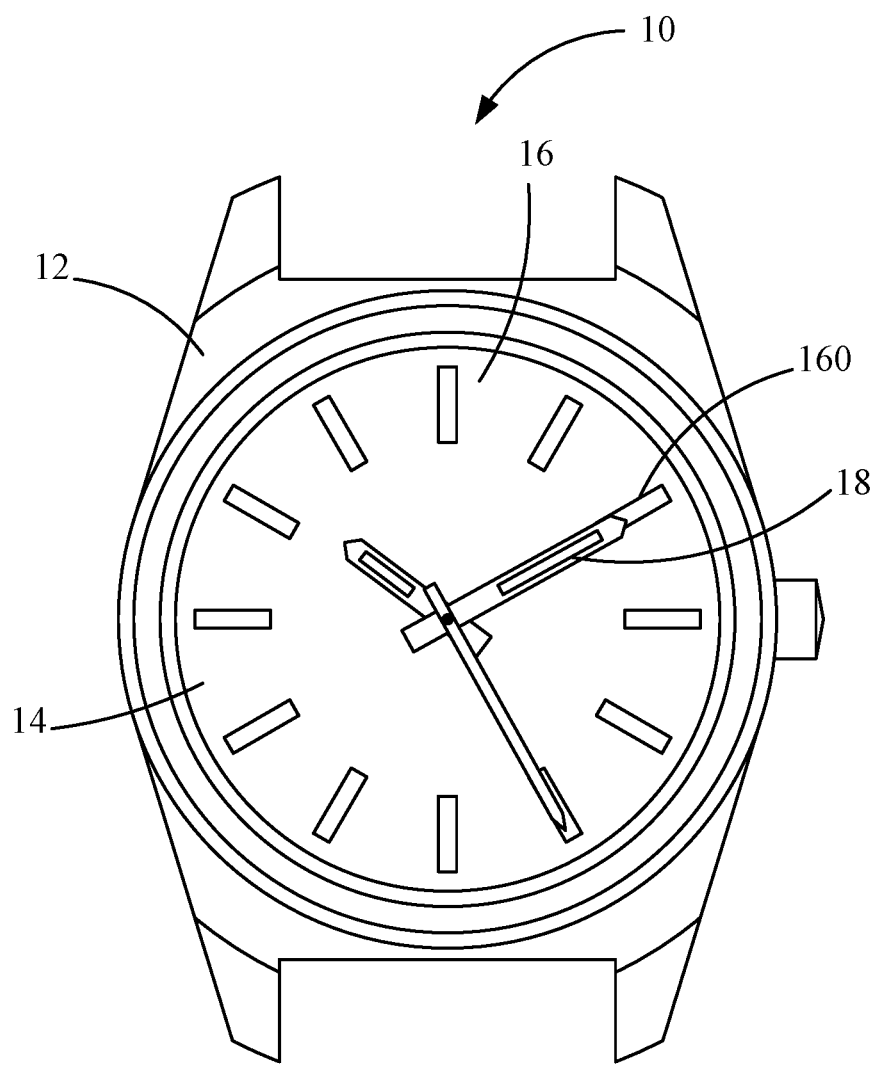
FIG. 1 is a top view of a wristwatch according to an embodiment of the present application.
Figure 2:
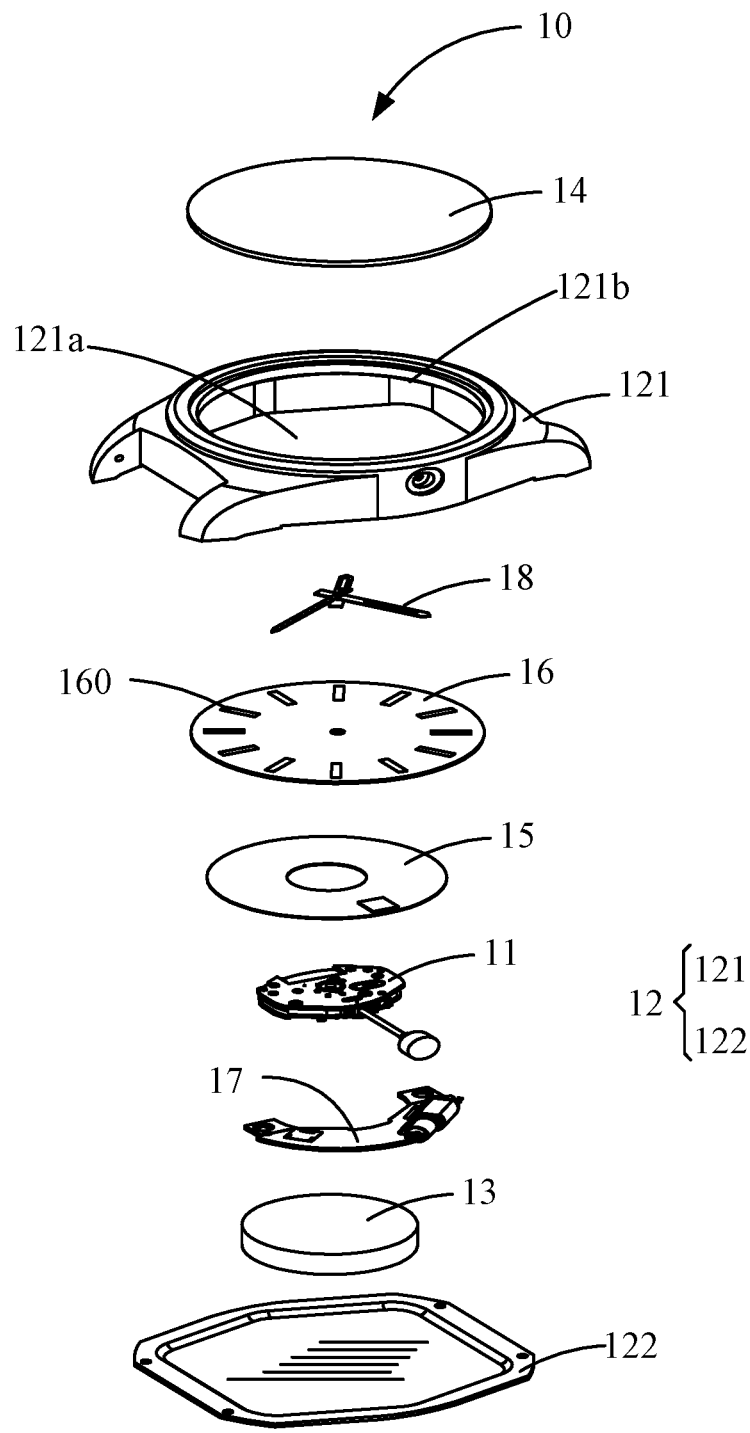
FIG. 2 is an exploded view of the wristwatch shown in FIG. 1.

The following is illustrated using a wristwatch having physical indicators. FIG. 1 is a top view of a wristwatch according to an embodiment of the present application. FIG. 2 is an exploded view of the wristwatch shown in FIG. 1.

As shown in FIGS. 1 and 2, the wristwatch 10 includes a housing 12, a transparent top cover 14, a dial 16, a plurality of physical scales 160 disposed on the dial 16, at least one physical indicator 18, and a movement 11. An opening exposes at a side of the housing 12. The transparent top cover 14 covers the exposed opening on the housing 12. The housing 12 and the transparent top cover 14 define a receiving room. Specifically, the housing 12 includes an outer case 121 and a bottom cover 122. The outer case 121 has a closed ring structure constructed by a successive solid material. The closed ring structure has a first opening 121a at a first side and a second opening 121b at a second side opposite to the first side. The first opening 121a of the closed ring structure is sealed by the bottom cover 122. The second opening 121b of the closed ring structure is sealed by the transparent top cover 14. The receiving room is defined by the outer case 121, the bottom cover 122, and the transparent top cover 14. The transparent top cover 14, the dial 16, the physical scales 160, the at least one physical indicator 18, and the movement 11 construct a time indicating device for providing time information.

The dial 16, the at least one physical indicator 18, and the movement 11 are disposed in the receiving room. The physical scales 160 on the dial 16 forms on a face of the dial 16 facing the transparent top cover 14. The at least one physical indicator 18 is located between the dial 16 and the transparent top cover 14. The at least one physical indicator 18 is located above the physical scales 160. Specifically, the physical scales 160 disposed on the face of the dial 16 are one to twelve o'clock, for example. The at least one physical indicator 18 may include an hour hand, a minute hand, and a second hand, or other indicators for specific use. The movement 11 is used to drive the at least one physical indicator 18 to provide the time information by cooperation between the at least one physical indicator 18 and the physical scales 160 on the dial 16. The transparent top cover 14 is transparent. Through the transparent top cover 14, the user can perceive position information (i.e., the time information) indicated by the at least one physical indicator 18.

The wristwatch 10 further includes a battery 13 configured to supply electric power to the movement 11 (and a short distance communication module 15 and a functional module 17 that will be described in further detail below). Delivery of the electric power of the battery 13 may be in charge of a power management unit (not shown) for providing stable and reliable electric power.

Figure 3:
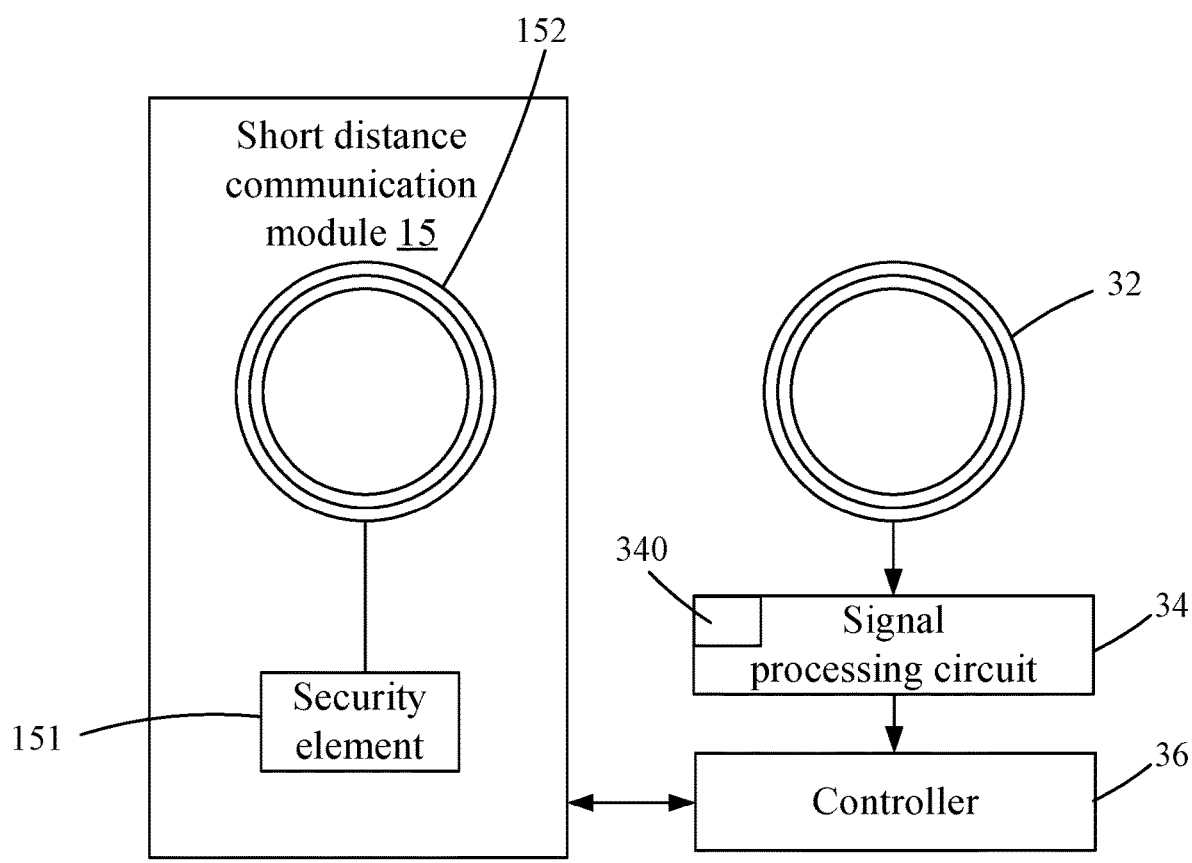
FIG. 3 is a schematic diagram showing a power saving framework according to an embodiment of the present application.

Referring to FIG. 3 with reference to FIG. 2, the wristwatch 10 further includes a short distance communication module 15 disposed in the receiving room. The short distance communication module 15 can implement short distance wireless communication with an external device. The short distance communication module 15 may include a radio frequency identification (RFID) module or a near field communication (NFC) module, but is not limited thereto. In an embodiment, the short distance communication module 15 operates at a frequency ranging from 1.32 MHz to 18 MHz (standard frequency is 13.56 MHz). The short distance communication module 15 has a communication distance equal to or less than 10 cm. Specifically, the short distance communication module 15 can communicate with the external device within the communication distance.

Specifically, the short distance communication module 15 includes a security element 151 and a first coil 152. The security element 151 is configured to process user security data. The first coil 152 is coupled to the security element 151 and is configured to transmit electromagnetic signals to communicate with the external device. When the security element 151 is to transmit signals to the external device, the first coil 152 is applied with an electric current varying with time to generate electromagnetic signals; when the external device is to transmit signals to the security element 151, the first coil 152 generates an electric current varying with time due to external electromagnetic signals and accordingly, the security element 151 can receive the signals transmitted by the external device. That is, the short distance communication module 15 of the wristwatch 10 communicates with external electronic devices (e.g., card readers) by transmitting the electromagnetic signals (i.e., short distance communication signals). In the context, the aforesaid "transmitting" can be referred to a pure "sending" action or a pure "receiving" action, but it can also be referred to "transceiving" (i.e., including sending and receiving actions).

In some embodiments, the short distance communication module 15 can be used in signal transmission required by various electronic identification tags or cards in implementing mobile payment, transaction message or other message storing, personal identification, and etc.

Referring to FIG. 3 with reference to FIG. 2, the wristwatch 10 further includes a second coil 32, a signal processing circuit 34, and a controller 36. The second coil 32 is coupled to the short distance communication module 15. The second coil 32 is configured to control the short distance communication module 15 to be turned on or off, that is, control transmission of the electromagnetic signals of the first coil 152 to be enabled or disabled. When the second coil 32 senses an external magnetic field having sufficient high strength, the short distance communication module 15 is turned on (i.e., transmission of the electromagnetic signals of the first coil 152 is enabled). When the second coil 32 does not sense an external magnetic field or senses an external magnetic field not having sufficient high strength, the short distance communication module 15 is turned off (i.e., transmission of the electromagnetic signals of the first coil 152 is disabled). Specifically, the second coil 152 is configured to sense an external magnetic field to generate a sensing signal, and the sensing signal is utilized to control the short distance communication module 15 to be turned on or off to enable or disable transmission of the electromagnetic signals of the first coil 152.

For example, when a user wants to use the wristwatch 10 to conduct a mobile payment, the user needs to place the wristwatch 10 close to an external device (e.g., a card reader) to implement short distance communication with the external device. When turned on, the external device continuously irradiates electromagnetic signals. When the user places the wristwatch 10 close to the external device, the second coil 32 of the wristwatch 10 senses an external magnetic field generated by the external device such that the short distance communication module 15 is turned on and the first coil 152 is enabled to transmit the electromagnetic signals to implement the mobile payment. In normal conditions, the second coil 32 of the wristwatch 10 will not sense any external magnetic field, and the short distance communication module 15 is thus in a turned-off state. As such, most of the time the short distance communication module 15 is turned off. The short distance communication can be automatically enabled when the user needs. Accordingly, power consumption can be reduced, and a risk of eavesdropping caused by enabling the short distance communication for a long time can be avoided.

Figure 4:
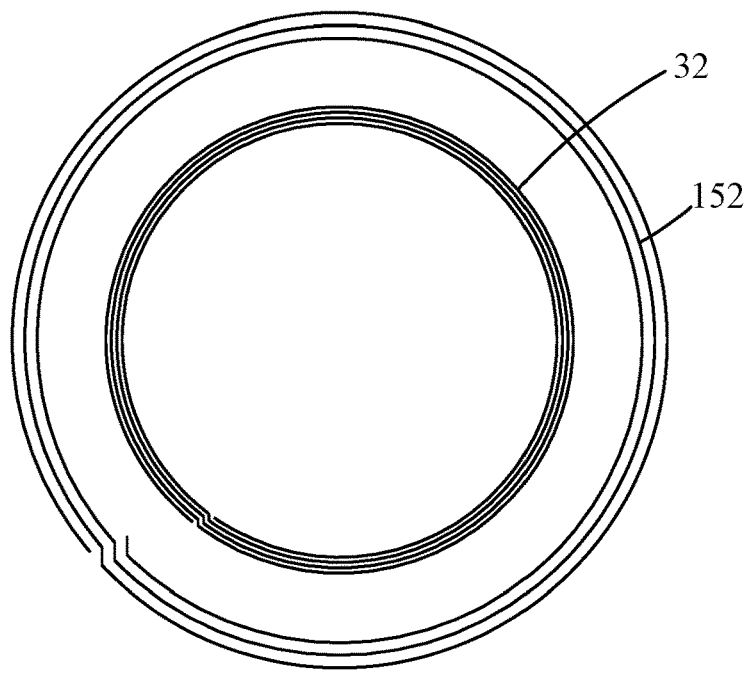
FIG. 4 is a schematic diagram showing an arrangement of a first coil and a second coil according to an embodiment of the present application.
Figure 5:
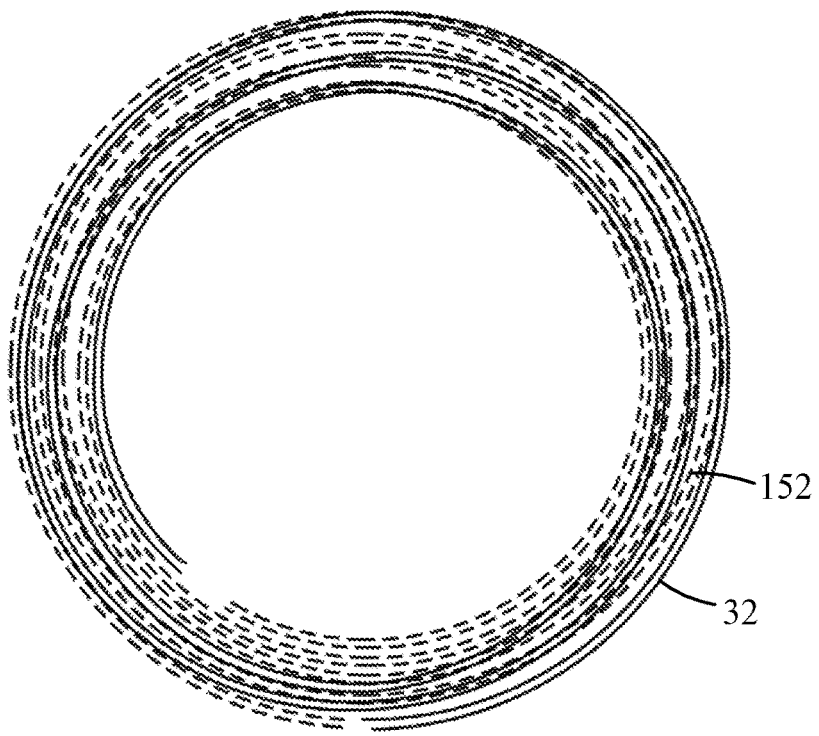
FIG. 5 is a schematic diagram showing an arrangement of a first coil and a second coil according to another embodiment of the present application.

Referring to FIGS. 4 and 5, the first coil 152 and the second coil 32 can be deployed together but the two cannot be directly connected to each other. In an embodiment, as shown in FIG. 4, the first coil 152 and the second coil 32 are located on a same plane, and the center of the first coil 152 and the center of the second coil 32 are overlapped on the plane. In another embodiment, as shown in FIG. 5, the first coil 152 and the second coil 32 are located on two parallel planes, respectively. The center of the first coil 152 and the center of the second coil 32 are overlapped along a projection direction.

Referring to FIG. 3 with reference to FIG. 2, the wristwatch 10 further includes a functional module 17 disposed in the receiving room. The signal processing circuit 34 and the controller 36 may be disposed in or included in the functional module 17. As shown in FIG. 3, the signal processing circuit 34 is connected to the second coil 32, and the controller 36 is connected between the signal processing circuit 34 and the short distance communication module 15. The signal processing circuit 34 is configured to process the sensing signal generated by sensing the external magnetic field by the second coil 32. The controller 36 receives an output signal transmitted from the signal processing circuit 34 and turns on or off the short distance communication module 15 based on the output signal.

Specifically, the signal processing circuit 34 may preprocess (e.g., rectify and amplify) the sensing signal from the second coil 32. Also, based on characteristics of the sensing signal, the signal processing circuit 34 generates a switch signal having a first voltage level (e.g., a high voltage level) and a second voltage level (e.g., a low voltage level). The switch signal is used to control the short distance communication module 15 to be turned on or off. In an embodiment, the switch signal is generated based on the strength of the sensing signal of the second coil 32. For example, when the strength of the sensing signal of the second coil 32 is greater than a strength threshold or falls into a predetermined strength range, the signal processing circuit 34 outputs a switch signal having the high voltage level. Otherwise, the signal processing circuit 34 outputs a switch signal having the low voltage level. In an embodiment, the switch signal is generated based on the frequency of the sensing signal of the second coil 32. For example, when the frequency of the sensing signal of the second coil 32 is greater than a frequency threshold or falls into a predetermined frequency range, the signal processing circuit 34 outputs a switch signal having the high voltage level. Otherwise, the signal processing circuit 34 outputs a switch signal having the low voltage level. Specifically, the signal processing circuit 34 includes a threshold circuit 340 configured to perform the afore-described comparison between the sensing signal and the threshold. The threshold circuit 340 may output the switch signal according to the strength, the frequency, or other characteristics of the sensing signal, or a combination of two or more than two characteristics of the sensing signal. The threshold circuit 340 has an input end receiving the sensing signal from the second coil 32 and an output end outputting the switch signal. The switch signal is a two-value output signal, for example, "1" representing a high voltage level signal and "0" representing a low voltage level signal.

The controller 36 receives the switch signal generated by the signal processing circuit 34. Based on the switch signal, the controller 36 is configured to generate a control signal for controlling the short distance communication module 15 to be turned on or off. When the controller 36 receives a switch signal having the first voltage level (e.g., the high voltage level) from the signal processing circuit 34, the controller 36 outputs the control signal to turn on the short distance communication module 15 to enable transmission of the electromagnetic signals of the first coil 152. When the controller 36 receives a switch signal having the second voltage level (e.g., the low voltage level) from the signal processing circuit 34, the controller 36 outputs the control signal to turn off the short distance communication module 15 to disable transmission of the electromagnetic signals of the first coil 152.

That is, the second coil 32 can sense the external magnetic field to generate an induced electric current. When the threshold circuit 340 of the signal processing circuit 34 determines that the sensing signal from the second coil 32 has sufficient high strength for example, it means that the user places the wristwatch 10 close to the external device (e.g., a card reader) and wants the wristwatch 10 to communicate with the external device. Accordingly, the controller 36 turns on the short distance communication module 15 such that the first coil 152 is able to transmit the electromagnetic signals to implement the short distance communication. When the threshold circuit 340 of the signal processing circuit 34 determines that the sensing signal from the second coil 32 has insufficient high strength for example, it means that the user is not intended to implement the short distance communication. Accordingly, the controller 36 turns off the short distance communication module 15 to disable transmission of the electromagnetic signals of the first coil 152.

In an embodiment, the controller 36 controls a period that the short distance communication module 15 is switched on, and automatically switches off the short distance communication module 15 at the end of the period. For example, the controller 36 can control the short distance communication module 15 to be turned on for a predetermined period of time (e.g., 10 seconds), and turns off the short distance communication module 15 when the predetermined period of time is exceeded. For example, when the second coil 32 senses an external magnetic field having sufficient high strength, the controller 36 turns on the short distance communication module 15 for 10 seconds and automatically turns off the short distance communication module 15 after 10 seconds. That is, the user is allowed to perform the short distance communication within 10 seconds. In such a way, interferences caused by a variation of distance between the wristwatch 10 and the external device can be avoided. Meanwhile, a risk of eavesdropping can be further avoided.

In the present application, the wristwatch 10 has the short distance communication module 15 disposed therein. The short distance communication module 15 includes the security element 151 configured to process user security data and the first coil 152 configured to transmit electromagnetic signals to communicate with an external device. In addition, the wristwatch 10 has the second coil 32 disposed therein. The second coil 32 is configured to sense an external magnetic field to generate a sensing signal, and the sensing signal is utilized to control the short distance communication module 15 to be turned on or off to enable or disable transmission of the electromagnetic signals of the first coil 152. When the wristwatch 10 is placed close to the external device, the second coil 32 senses the external magnetic field generated by the external device such that the short distance communication module 15 is turned on to enable the first coil 152 to transmit the electromagnetic signals. That is, the short distance communication module 15 can be automatically turned on when short distance communication is needed. The short distance communication module 15 can be automatically turned off when short distance communication is not needed. The present application can reduce a risk of eavesdropping and a risk of being stolen for security data during communication, and meanwhile, can also save power consumption by the wristwatch 10.

Figure 6:
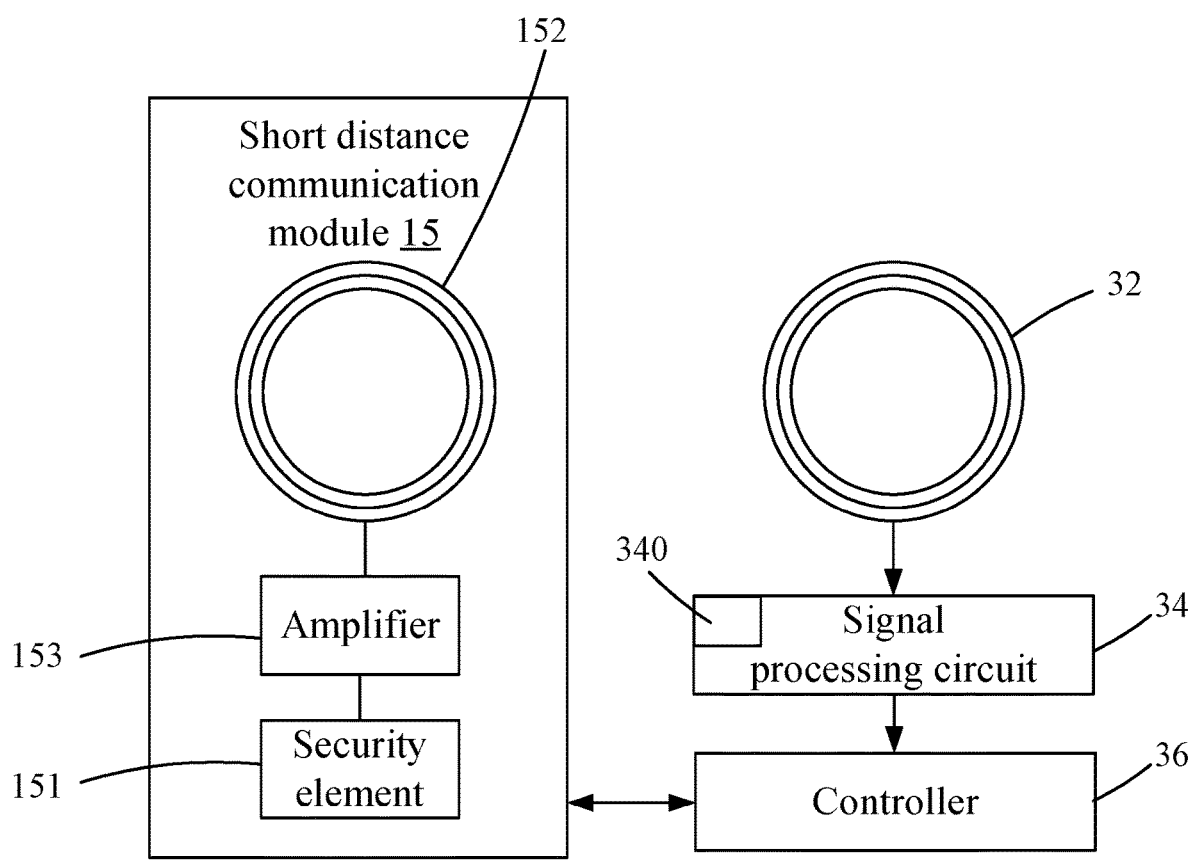
FIG. 6 is a schematic diagram showing a power saving framework according to another embodiment of the present application.

In an embodiment of the present application, referring to FIG. 6, the short distance communication module 15 further includes an amplifier 153. The amplifier 153 is disposed between the first coil 152 and the security element 151 and is configured to increase or adjust strength of the electromagnetic signals transmitted by the first coil 152 to adjust a signal transmission distance. A gain of the amplifier 153 may be controlled by the controller 36. It can also direct the controller 36 to adjust the gain of the amplifier 153 by a user operation. Specifically, after receiving the user operation, the controller 36 transmits an adjusting signal to the amplifier 153 of the short distance communication module 15 to make the amplifier 153 adjust an amount of an electric current, thereby adjusting the strength of the electromagnetic signals transmitted to or received by the first coil 152. In another example, after receiving the user operation, the controller 36 can adjust the electric current outputted from the amplifier 153 to be zero or a predetermined amount, or switch the size of the electric current according to a predetermined order. Accordingly, by the user operation, a user can conveniently control the electromagnetic signals transmitted by the first coil 152 of the short distance communication module 15 of the wristwatch 10, thereby switching on, off, or adjusting the electromagnetic signals. Accordingly, unnecessary power consumed by the short distance communication module 15 can be reduced.

In an embodiment of the present application, referring to FIGS. 1, 2, and 6, the outer case 121 and the bottom cover 122 of the housing 12 are made of metal materials and the transparent top cover 14 is made of non-metal material. The closed ring structure of the outer case 121 has a closed ring configuration constructed by a successive, solid, metal material. The bottom cover 122 seals the first opening (e.g., a lower opening) 121a of the closed ring configuration. The transparent top cover 14 seals the second opening (e.g., an upper opening) 121b of the closed ring configuration. This type of wristwatch has a communication portal defined by the second opening (corresponding to the transparent top cover 14 made of the non-metal material) of the closed ring structure of the outer case 121. That is, the first coil 152 and the second coil 32 of the wristwatch 10 transmit or sense the electromagnetic signals mainly by the communication portal. The signals will be shielded or decayed by the outer case 121 and the bottom cover 122 that are made of metal materials. Since short distance wireless communication signals have a certain degree of directionality, such a wristwatch can avoid a risk of eavesdropping during communication. This structure causes attenuation of communication signals for a certain degree. However, by deploying the amplifier 153 in the short distance communication module 15 (as shown in FIG. 6), the problem of insufficient strength of the communication signals can be overcome. The deployment of the amplifier 153 can be further utilized to overcome the problem of the short distance communication signals being attenuated due to interferences with inner components (e.g., an electric motor) of the wristwatch 10.

Figure 7:
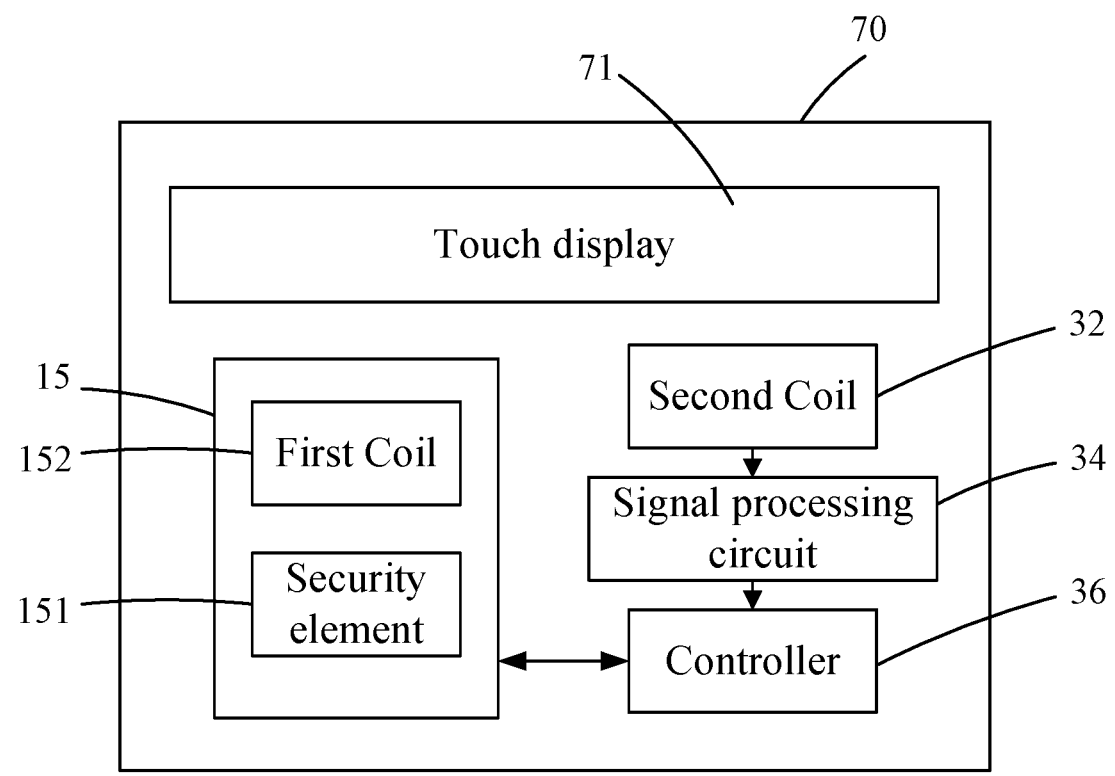
FIG. 7 is an explored view of a wristwatch according to another embodiment of the present application.

Referring to FIG. 7, the wristwatch of the present application is not limited to a wristwatch having the physical indicator (e.g., a hour hand and a minute hand). It can be a wristwatch having a display or a touch display (e.g., a smartwatch). As shown in FIG. 7, the wristwatch 70 has a touch display 71 having an ability to provide the time information. The touch display 71 may display other information. The wristwatch 70 deploys a short distance communication module 15 including a security element 151 and a first coil 152. An amplifier may be further deployed as desired to amplify the electromagnetic signals transmitted by the first coil 152. The afore-described power saving scheme is carried out by a controller 36, a signal processing circuit 34, and a second coil 32. In some embodiments, the touch display 71 covers the exposed opening on the housing of the wristwatch 70 but allows the electromagnetic signals to pass through. The housing and the touch display 71 of the wristwatch 70 defines a receiving room for accommodating the short distance communication module 15, the controller 32, the signal processing circuit 34, the second coil 32, and other electronic components. The housing of the wristwatch 70 may be made of metal material. It can also be made of non-metal material. Basically, the touch display 71 will not significantly interfere or shield the electromagnetic signals transmitted by the first coil 152 and the second coil 32.

In above context, the first coil 152 and the second coil 32 are disposed in the wristwatch. However, in some embodiments, the first coil 152 and the second coil 32 may also be disposed on an inner surface, an outer surface, or other appropriate locations of the housing of the wristwatch. The power saving scheme of the present application may not depend on locations of the first coil 152 and the second coil 32.

Figure 8:
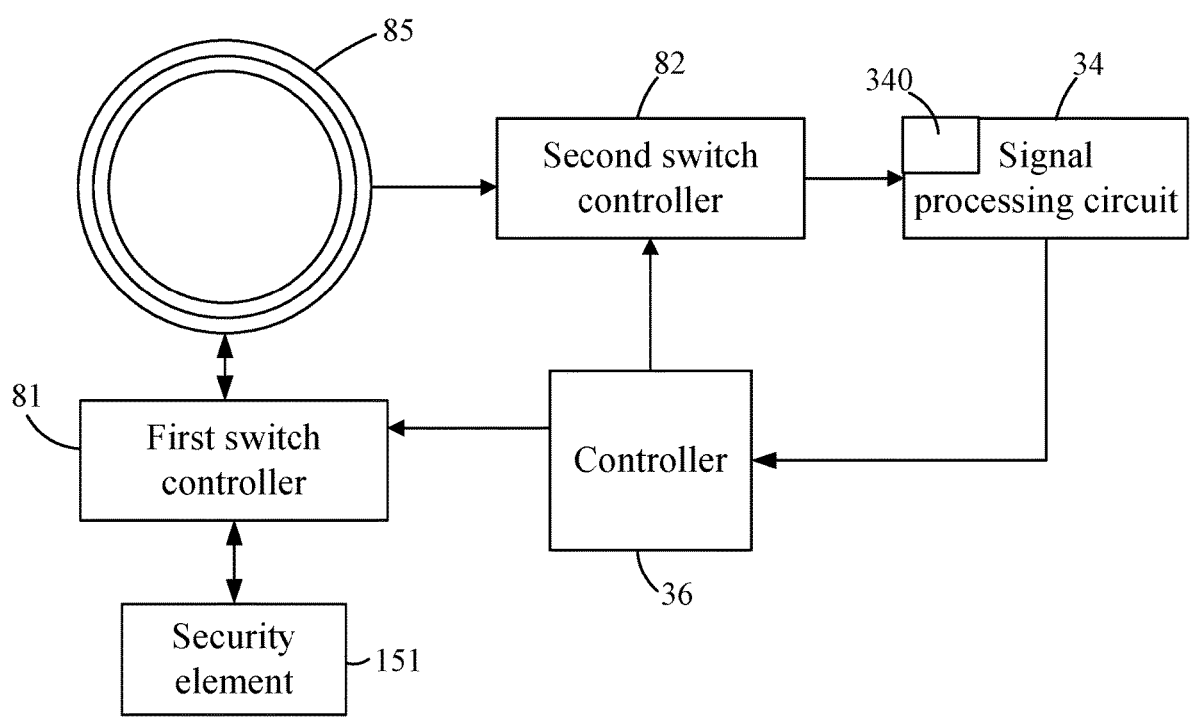
FIG. 8 is a schematic diagram showing a power saving framework according to yet another embodiment of the present application.

In an embodiment of the present application, deployment of the second coil 32 may not be required. The signal processing circuit 34 and the controller 36 may control the short distance communication module 15 to be turned on or off according to a sensing signal generated by the first coil 152 by sensing an external magnetic field. Referring to FIG. 8, the wristwatch has a short distance communication module disposed therein, which includes a security element 151 and a coil 52 (corresponding to the first coil 152 in above context). The wristwatch further has a signal processing circuit 34 including a threshold circuit 340, a controller 36, a first switch controller 81, and a second switch controller 82. The functions of the security element 151, the coil 52, the signal processing circuit 34, the threshold circuit 340, and the controller 36 refer to above context. The first switch controller 81 and the second switch controller 82 are configured to control a circuit to form a closed circuit or an open circuit.

As shown in FIG. 8, the first switch controller 81 is connected between the coil 85 and the security element 151 and the second switch controller 82 is connected between the coil 85 and the signal processing circuit 34. That is, the signal processing circuit 34 is connected to the coil 85 of the short distance communication module via the second switch controller 82. The controller 36 has an input end connected to the signal processing circuit 34 for receiving a switch signal generated by the signal processing circuit 34, and an output end connected to the first switch controller 81 and the second switch controller 82 for controlling a circuit connected therewith to form a closed circuit or an open circuit.

The signal processing circuit 34 processes a sensing signal generated by sensing an external magnetic field by the coil 85 to generate a switch signal having any of a first voltage level and a second voltage level. The controller 36 receives the switch signal generated by the signal processing circuit 34. When the switch signal has the first voltage level, the controller 36 turns on the first switch controller 81 and turns off the second switch controller 82 to form a closed circuit between the coil 85 and the security element 151 and an open circuit between the coil 85 and the signal processing circuit 34. When the switch signal has the second voltage level, the controller 36 turns off the first switch controller 81 and turns on the second switch controller 82 to form an open circuit between the coil 85 and the security element 151 and a closed circuit between the coil 85 and the signal processing circuit 34.

In an initial state, the controller 36 controls the first switch controller 81 to be turned off to form an open circuit between the coil 85 and the security element 151, and meanwhile, controls the second switch controller 82 to be turned on to form a closed circuit between the coil 85 and the signal processing circuit 34.

The external magnetic field sensed by the coil 85 is usually very small or is likely to be zero. The signal processing circuit 34 continuously outputs a switch signal having the second voltage level (e.g., a low voltage level) to the controller 36, and thus the first switch controller 81 is turned off and the second switch controller 82 is turned on. The signal processing circuit 34 continuously monitors whether an external magnetic field exists. Meanwhile, the short distance communication is disabled so as to save electric power.

When a user places the wristwatch close to an external device (e.g., a card reader), the coil 85 senses a signal having a sufficient high strength due to the external magnetic field generated by the external device. Accordingly, the signal processing circuit 34 outputs a switch signal having the first voltage level (e.g., a high voltage level) to the controller 36. The controller 36 turns on the first switch controller 81 to implement the short distance communication, and meanwhile, turns off the second switch controller 82 so as to avoid interferences to the short distance communication.

When the short distance communication is enabled for a period of time, the controller 36 turns off the first switch controller 81 and turns on the second switch controller 82. A user is allowed to perform the short distance communication within the period of time. After the period of time, detection of the external magnetic field is executed again.

The embodiment illustrated in FIG. 8 is applicable to a wristwatch having the physical indicator (as shown in FIGS. 1 and 2). The housing (including the outer case and the bottom cover) of the wristwatch may be made of metal material. It is also applicable to a wristwatch having the display or the touch display (as shown in FIG. 7), for example, a smartwatch. The amplifier 153 shown in FIG. 6 can also be disposed between the coil 85 and the security element 151 in the embodiment illustrated in FIG. 8.

Figure 9:
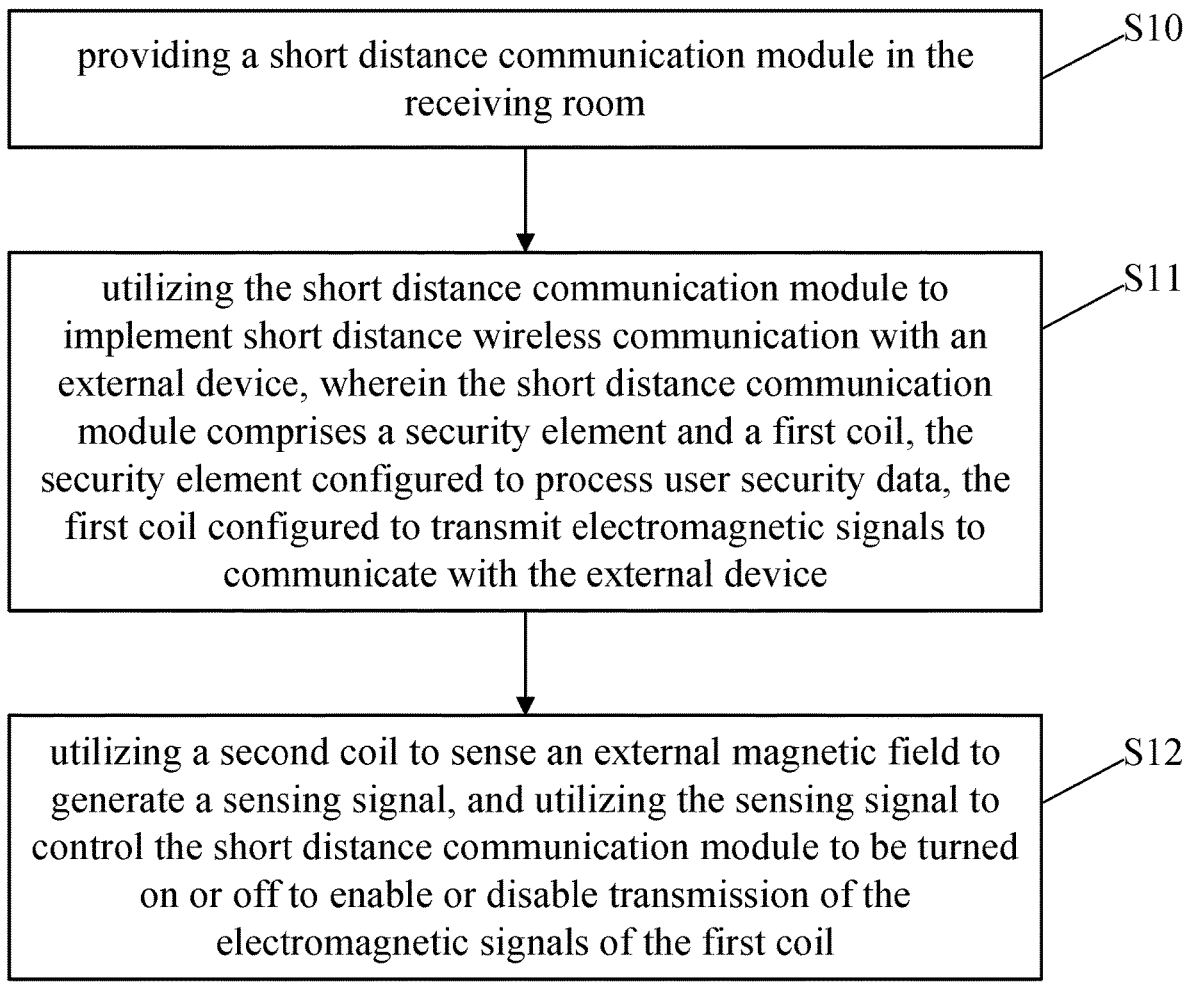
FIG. 9 is a flowchart of a power saving method for a wristwatch according to an embodiment of the present application.

FIG. 9 is a flowchart of a power saving method for a wristwatch according to an embodiment of the present application. The wristwatch includes a time indicating device and a housing. The time indicating device is configured to provide time information. The housing defines a receiving room. Referring to FIGS. 3 and 9 with reference to above context, the method includes the following steps.

Step S10—providing a short distance communication module 15 in the receiving room;

Step S11—utilizing the short distance communication module 15 to implement short distance wireless communication with an external device, wherein the short distance communication module 15 includes a security element 151 and a first coil 152, the security element 151 configured to process user security data, the first coil 152 configured to transmit electromagnetic signals to communicate with the external device; and Step S012—utilizing a second coil 32 to sense an external magnetic field to generate a sensing signal, and utilizing the sensing signal to control the short distance communication module 15 to be turned on or off to enable or disable transmission of the electromagnetic signals of the first coil 152.

Other details of the power saving method illustrated in FIG. 9 can be referred to the descriptions on the wristwatch in above context, and are not repeated herein.

Figure 10:
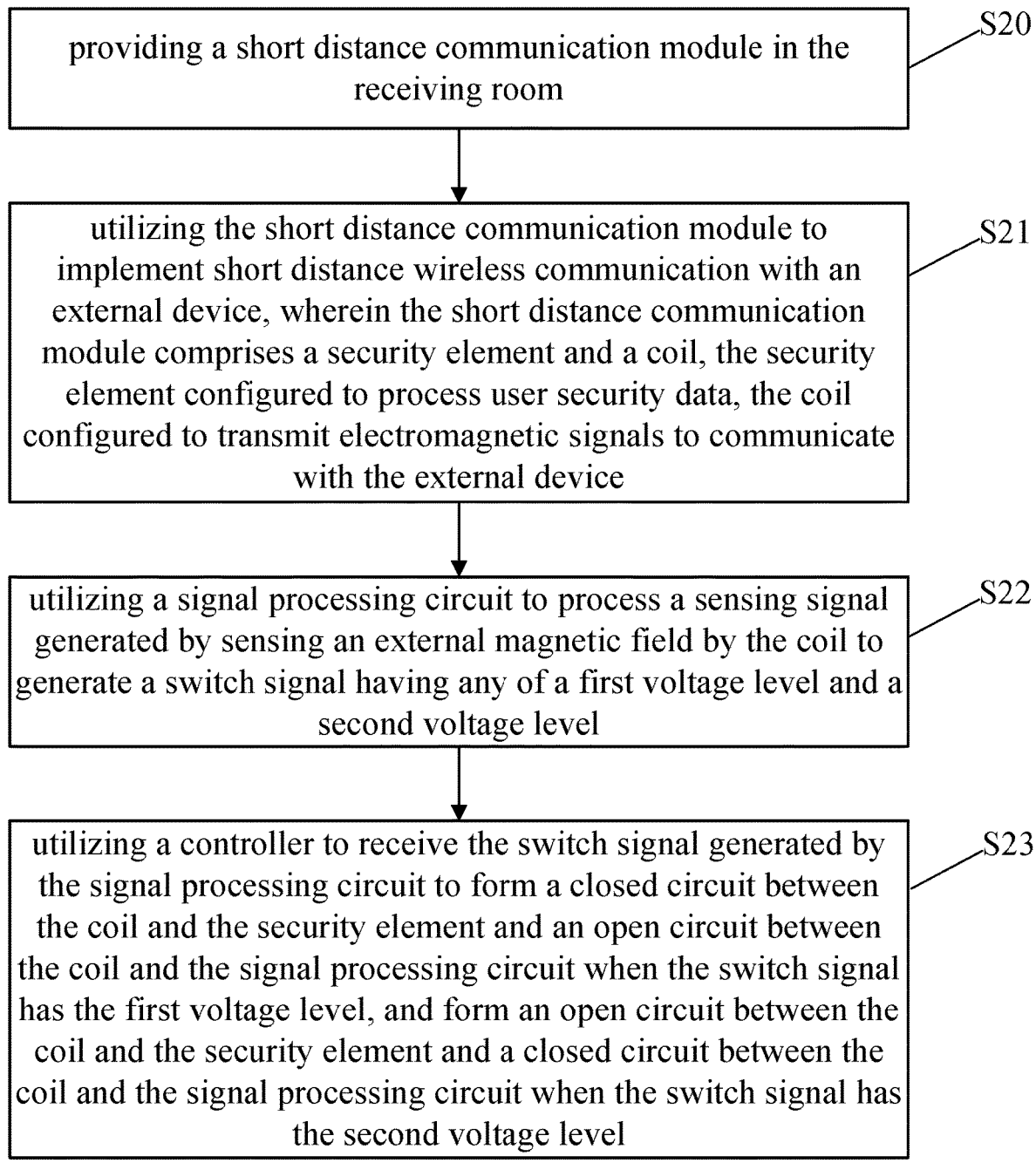
FIG. 10 is a flowchart of a power saving method for a wristwatch according to another embodiment of the present application.

FIG. 10 is a flowchart of a power saving method for a wristwatch according to another embodiment of the present application. The wristwatch includes a time indicating device and a housing. The time indicating device is configured to provide time information. The housing defines a receiving room. Referring to FIGS. 8 and 10 with reference to above context, the method includes the following steps.

Step S20—providing a short distance communication module 15 in the receiving room;

Step S21—utilizing the short distance communication module 15 to implement short distance wireless communication with an external device, wherein the short distance communication module 15 includes a security element 151 and a coil 85, the security element 151 configured to process user security data, the coil 85 configured to transmit electromagnetic signals to communicate with the external device;

Step S22—utilizing a signal processing circuit 34 to process a sensing signal generated by sensing an external magnetic field by the coil 85 to generate a switch signal having any of a first voltage level and a second voltage level; and Step S23—utilizing a controller 36 to receive the switch signal generated by the signal processing circuit 34 to form a closed circuit between the coil 85 and the security element 151 and an open circuit between the coil 85 and the signal processing circuit 34 when the switch signal has the first voltage level, and form an open circuit between the coil 85 and the security element 151 and a closed circuit between the coil 85 and the signal processing circuit 34 when the switch signal has the second voltage level.

Other details of the power saving method illustrated in FIG. 10 can be referred to the descriptions on the wristwatch in above context, and are not repeated herein.

The power saving methods of the present application illustrated in FIGS. 9 and 10 are applicable to a wristwatch having the physical indicator (as shown in FIGS. 1 and 2). The housing (including the outer case and the bottom cover) of the wristwatch may be made of metal material. It is also applicable to a wristwatch having the display or the touch display (as shown in FIG. 7), for example, a smartwatch. It can also use the amplifier 153 shown in FIG. 6 to amplify the electromagnetic signals transmitted in the short distance communication.

While the preferred embodiments of the present application have been illustrated and described in detail, various modifications and alterations can be made by persons skilled in this art. The embodiment of the present application is therefore described in an illustrative but not restrictive sense. It is intended that the present application should not be limited to the particular forms as illustrated, and that all modifications and alterations which maintain the realm of the present application are within the scope as defined in the appended claims.

The invention claimed is:

1. A wristwatch, comprising:
a time indicating device, configured to provide time information;
a housing, defining a receiving room;
a short distance communication module disposed in the receiving room, configured to implement short distance wireless communication with an external device, the short distance communication module comprising:
a security element, configured to process user security data; and
a first coil, coupled to the security element and configured to transmit electromagnetic signals to communicate with the external device;
the wristwatch further comprising:
a second coil, coupled to the short distance communication module, configured to sense an external magnetic field to generate a sensing signal, the sensing signal provided for controlling the short distance communication module to be turned on or off to enable or disable transmission of the electromagnetic signals of the first coil.

2. The wristwatch according to claim 1, wherein an opening exposes at a side of the housing, and the time indicating device comprises:
a transparent top cover, covering the exposed opening on the housing, the housing and the transparent top cover defining the receiving room;
a dial, disposed in the receiving room;
a plurality of physical scales, forming on a face of the dial facing the transparent top cover;
at least one physical indicator, located between the dial and the transparent top cover; and
a movement, configured to drive the at least one physical indicator to provide the time information by cooperation between the at least one physical indicator and the physical scales on the dial.

3. The wristwatch according to claim 2, wherein the housing comprises:
an outer case having a closed ring structure made of metal material, the closed ring structure having a closed ring configuration constructed by a successive, solid, metal material, the closed ring structure having a first opening at a first side and a second opening at a second side opposite to the first side; and
a bottom cover made of metal material, the bottom cover sealing the first opening of the closed ring structure and the transparent top cover sealing the second opening of the closed ring structure, the transparent top cover made of non-metal material.

4. The wristwatch according to claim 1, wherein an opening exposes at a side of the housing, and the time indicating device comprises:
a touch display, covering the exposed opening on the housing but allowing transmission of the electromagnetic signals, the touch display having a function of providing the time information, the receiving room defined between the housing and the touch display.

5. The wristwatch according to claim 1, further comprising:
a signal processing circuit connected to the second coil, configured to process the sensing signal generated by sensing the external magnetic field by the second coil to generate a switch signal having any of a first voltage level and a second voltage level; and
a controller connected between the signal processing circuit and the short distance communication module, configured to receive the switch signal generated by the signal processing circuit, turn on the short distance communication module to enable transmission of the electromagnetic signals of the first coil when the switch signal has the first voltage level, and turn off the short distance communication module to disable transmission of the electromagnetic signals of the first coil when the switch signal has the second voltage level.

6. The wristwatch according to claim 5, wherein the switch signal is generated based on strength of the sensing signal of the second coil.

7. The wristwatch according to claim 5, wherein the switch signal is generated based on a frequency of the sensing signal of the second coil.

8. The wristwatch according to claim 5, wherein the signal processing circuit comprises a threshold circuit having an input end receiving the sensing signal of the second coil and an output end outputting the switch signal, and the switch signal is a two-value output signal.

9. The wristwatch according to claim 5, wherein the controller controls a period that the short distance communication module is switched on, and automatically switches off the short distance communication module at the end of the period.

10. The wristwatch according to claim 1, wherein the short distance communication module further comprises:
an amplifier disposed between the first coil and the security element, configured to increase or adjust strength of the electromagnetic signals transmitted by the first coil to adjust a signal transmission distance.

11. A wristwatch, comprising:
a time indicating device, configured to provide time information;
a housing, defining a receiving room;
a short distance communication module disposed in the receiving room, configured to implement short distance wireless communication with an external device, the short distance communication module comprising:
a security element, configured to process user security data; and
a coil, coupled to the security element and configured to transmit electromagnetic signals to communicate with the external device;
the wristwatch further comprising:
a first switch controller connected between the security element and the coil;
a second switch controller connected to the coil of the short distance communication module;
a signal processing circuit connected to the coil of the short distance communication module via the second switch controller, configured to process a sensing signal generated by sensing an external magnetic field by the coil to generate a switch signal having any of a first voltage level and a second voltage level; and a controller connected to or coupled to the first switch controller, the second switch controller, and the signal processing circuit, configured to receive the switch signal generated by the signal processing circuit, wherein when the switch signal has the first voltage level, the controller turns on the first switch controller and turns off the second switch controller to form a closed circuit between the coil and the security element and an open circuit between the coil and the signal processing circuit; when the switch signal has the second voltage level, the controller turns off the first switch controller and turns on the second switch controller to form an open circuit between the coil and the security element and a closed circuit between the coil and the signal processing circuit.

12. The wristwatch according to claim 11, wherein an opening exposes at a side of the housing, and the time indicating device comprises:

a transparent top cover, covering the exposed opening on the housing, the housing and the transparent top cover defining the receiving room;

a dial, disposed in the receiving room;

a plurality of physical scales, forming on a face of the dial facing the transparent top cover;

at least one physical indicator, located between the dial and the transparent top cover; and a movement, configured to drive the at least one physical indicator to provide the time information by cooperation between the at least one physical indicator and the physical scales on the dial.

13. The wristwatch according to claim 12, wherein the housing comprises:

an outer case having a closed ring structure made of metal material, the closed ring structure having a closed ring configuration constructed by a successive, solid, metal material, the closed ring structure having a first opening at a first side and a second opening at a second side opposite to the first side; and a bottom cover made of metal material, the bottom cover sealing the first opening of the closed ring structure and the transparent top cover sealing the second opening of the closed ring structure, the transparent top cover made of non-metal material.

14. The wristwatch according to claim 11, wherein an opening exposes at a side of the housing, and the time indicating device comprises:

a touch display, covering the exposed opening on the housing but allowing transmission of the electromagnetic signals, the touch display having a function of providing the time information, the receiving room defined between the housing and the touch display.

15. The wristwatch according to claim 11, wherein the controller controls a period that the first switch controller is switched on, and at the end of the period, automatically switches off the first switch controller and switches on the second switch controller to form the open circuit between the coil and the security element and the closed circuit between the coil and the signal processing circuit.

16. The wristwatch according to claim 11, wherein the short distance communication module further comprises:

an amplifier disposed between the coil and the security element, configured to increase or adjust strength of the electromagnetic signals transmitted by the coil to adjust a signal transmission distance.

17. A power saving method for a wristwatch, the wristwatch comprising a time indicating device and a housing, the time indicating device configured to provide time information, the housing defining a receiving room, the method comprising:

providing a short distance communication module in the receiving room;

utilizing the short distance communication module to implement short distance wireless communication with an external device, wherein the short distance communication module comprises a security element and a first coil, the security element configured to process user security data, the first coil configured to transmit electromagnetic signals to communicate with the external device; and utilizing a second coil to sense an external magnetic field to generate a sensing signal, and utilizing the sensing signal to control the short distance communication module to be turned on or off to enable or disable transmission of the electromagnetic signals of the first coil.

18. The method according to claim 17, wherein an opening exposes at a side of the housing, and the time indicating device comprises:

a transparent top cover, covering the exposed opening on the housing, the housing and the transparent top cover defining the receiving room;

a dial, disposed in the receiving room;

a plurality of physical scales, forming on a face of the dial facing the transparent top cover;

at least one physical indicator, located between the dial and the transparent top cover; and a movement, configured to drive the at least one physical indicator to provide the time information by cooperation between the at least one physical indicator and the physical scales on the dial.

19. The method according to claim 18, wherein the housing comprises:

an outer case having a closed ring structure made of metal material, the closed ring structure having a closed ring configuration constructed by a successive, solid, metal material, the closed ring structure having a first opening at a first side and a second opening at a second side opposite to the first side; and a bottom cover made of metal material, the bottom cover sealing the first opening of the closed ring structure and the transparent top cover sealing the second opening of the closed ring structure, the transparent top cover made of non-metal material.

20. A power saving method for a wristwatch, the wristwatch comprising a time indicating device and a housing, the time indicating device configured to provide time information, the housing defining a receiving room, the method comprising:

providing a short distance communication module in the receiving room;

utilizing the short distance communication module to implement short distance wireless communication with an external device, wherein the short distance communication module comprises a security element and a coil, the security element configured to process user security data, the coil configured to transmit electromagnetic signals to communicate with the external device;

utilizing a signal processing circuit to process a sensing signal generated by sensing an external magnetic field by the coil to generate a switch signal having any of a first voltage level and a second voltage level; and utilizing a controller to receive the switch signal generated by the signal processing circuit to form a closed circuit between the coil and the security element and an open circuit between the coil and the signal processing circuit when the switch signal has the first voltage level, and form an open circuit between the coil and the security element and a closed circuit between the coil and the signal processing circuit when the switch signal has the second voltage level.

\* \* \* \* \*